Patented Nov. 16, 1926.

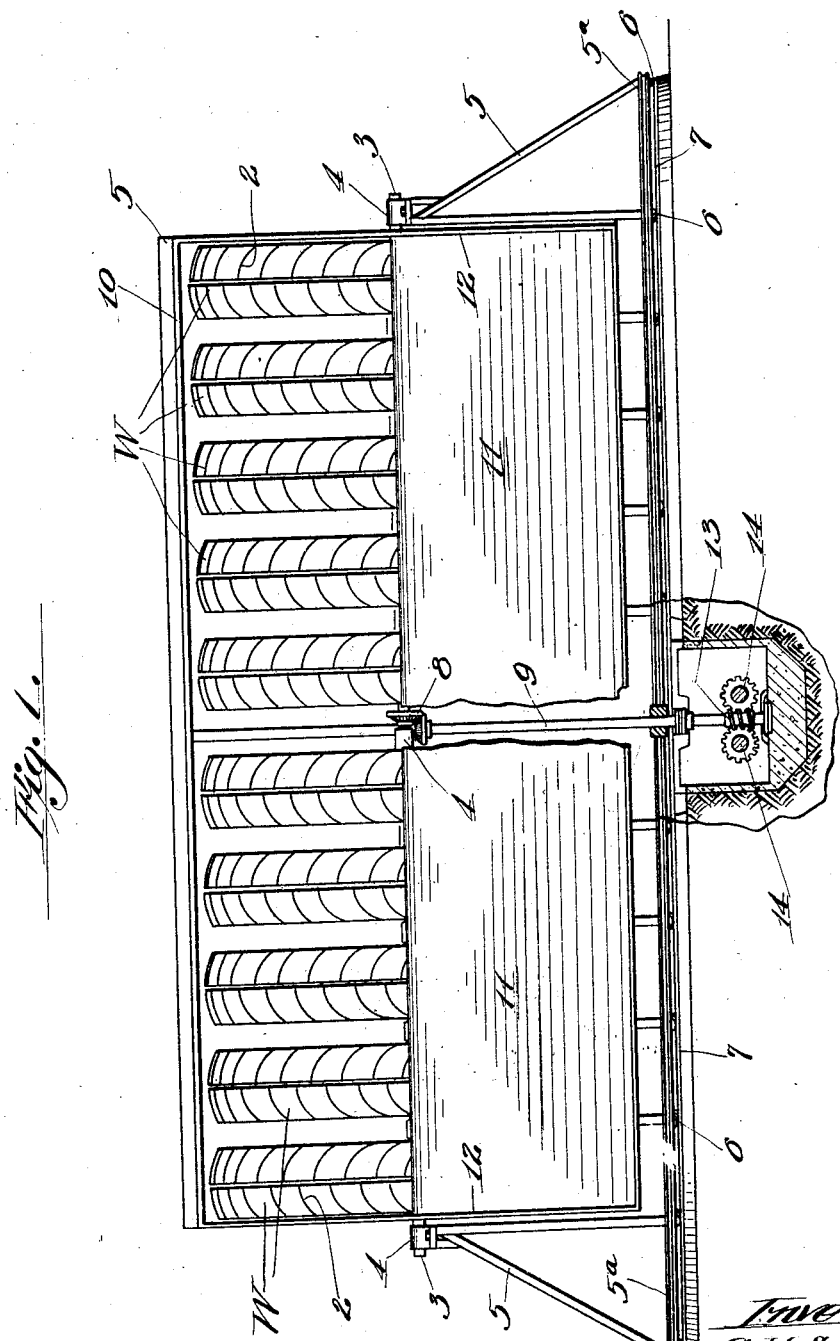

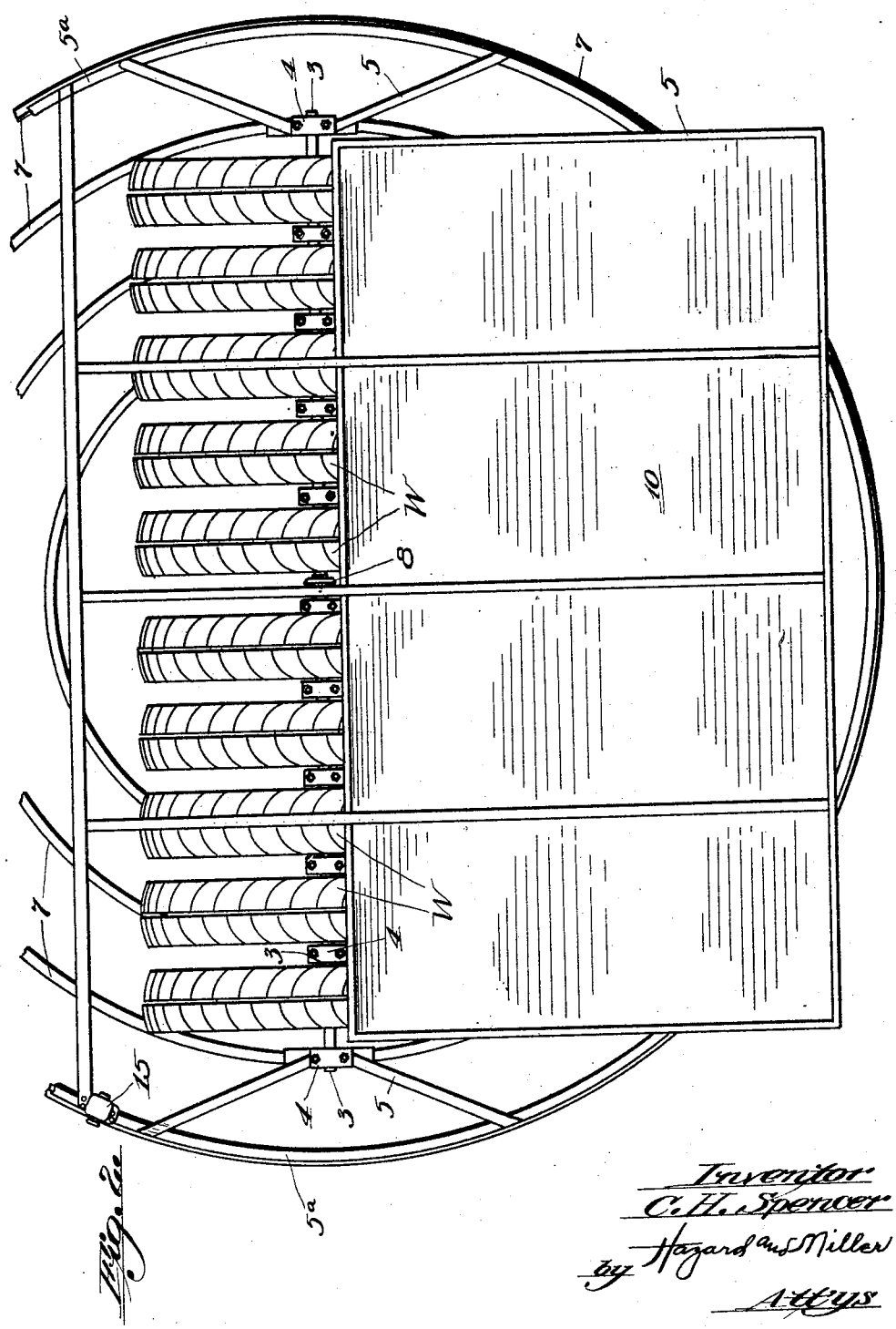

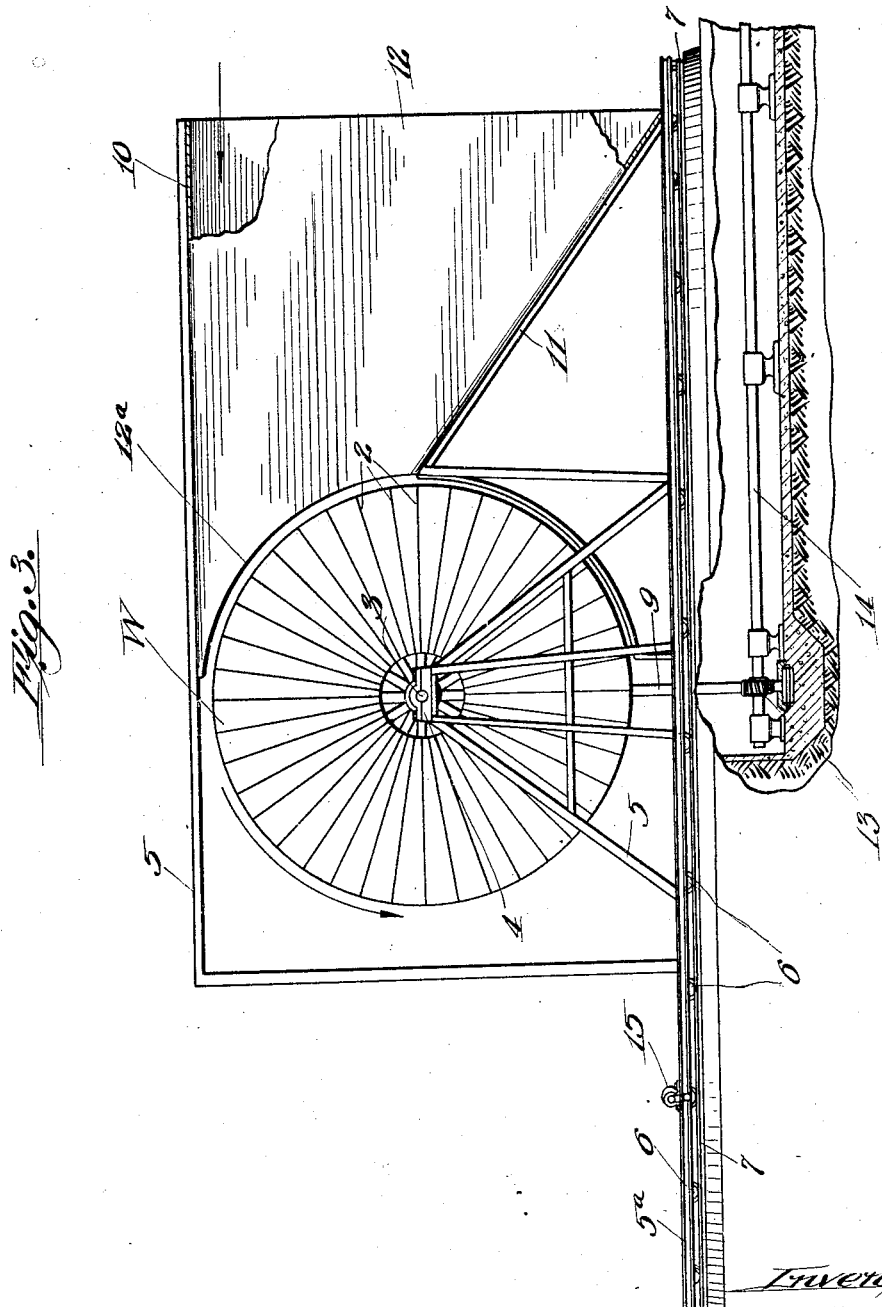

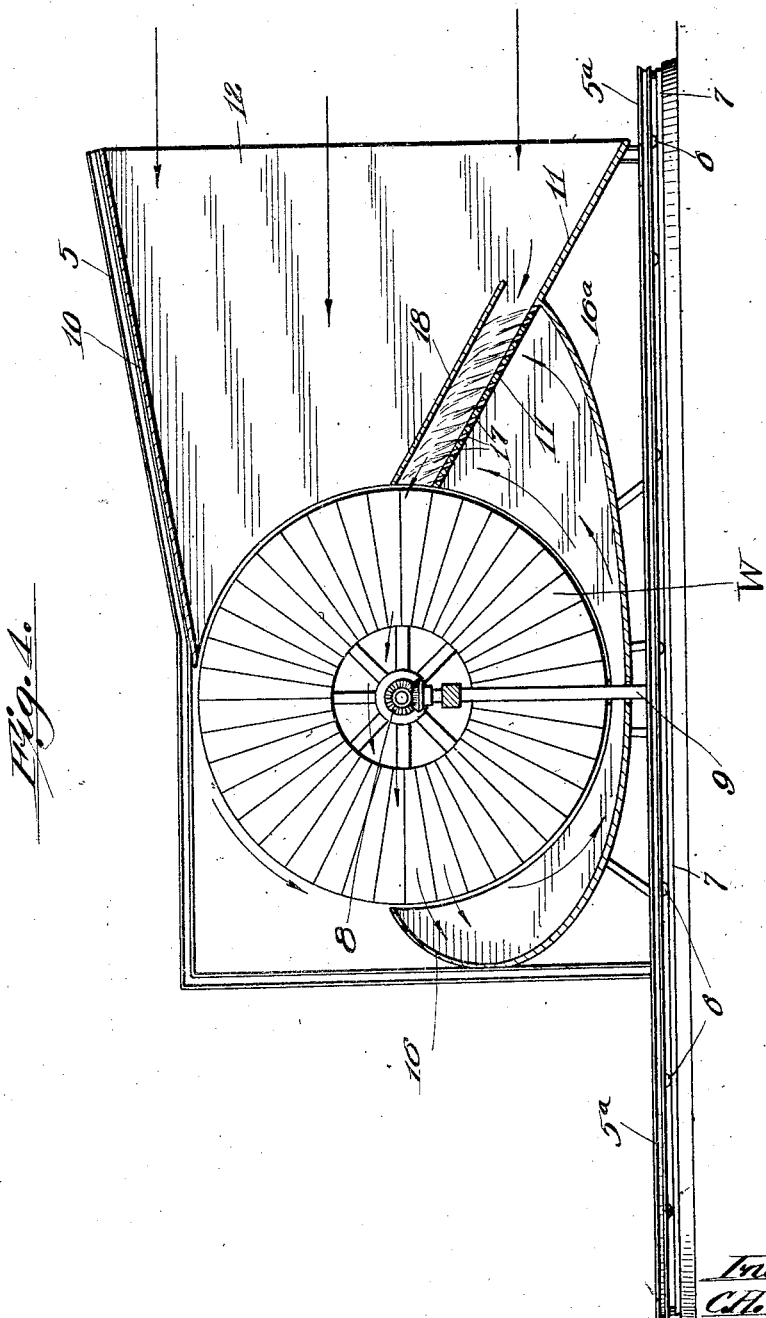

1,607,317

UNITED STATES PATENT OFFICE.

CHARLES H. SPENCER, OF LOS ANGELES, CALIFORNIA.

WIND-POWER APPARATUS.

Application filed June 27, 1924. Serial No. 722,682.

This invention relates to wind powers, and more particularly to wind powers of considerable size.

An object of the invention is to provide a wind power of very large overall dimensions such, for instance, as hundreds of feet high and long. Another object is to provide large size apparatus for the absorption of power from wind pressure by means of turbine wheels presented edgewise to the wind, and to provide for the concentration of air under wind pressure so that it will be efficiently expended against blades of turbine wheels. Another object is to provide a turbine wind wheel structure including a gang of wheels connected so as to concurrently operate to deliver power to an absorbing shaft or shafts, and further to provide a turbo-wind power in which a gang of turbine wheels are mounted so as to swing as a unit on a horizontal orbit about a vertical axis, thus to maintain the face of the apparatus to the wind, irrespective of the direction from which it may come.

Other objects and advantages will be made manifest in the following specification of an embodiment of the invention illustrated in the accompanying drawings, wherein—

Figure 1 is a front elevation and vertical section of the apparatus.

Fig. 2 is a plan of the apparatus.

Fig. 3 is an end elevation with a portion of the apparatus in vertical section.

Fig. 4 is a vertical, longitudinal section of the apparatus showing an air resistance reducer.

The present invention consists of a gang of wind wheels W, preferably of a type having substantially radial blades 2, which are presented edgewise to the wind; the blades 2 of each wheel preferably being provided with a concave, effective front face, and each wheel comprising two parallel series of the blades. The blades are so set in each series that their front faces incline inwardly toward a medial plane between the sides of the turbine wheel, and the contiguous or inside radial edges of the blades 2 of the series are preferably staggered or offset circumferentially, as clearly shown in Figure 1, thus forming an intermediate, distributing space peripherally around each wheel for the dispersion of the air as it is deflected inwardly by the front, concaved faces of the individual blades.

The air is deflected from the concave face of each blade and expelled across the intermediate space between the two series of blades in each wheel, so that the air deflected from initial contact with one blade may react on the alternate, following and oppositely inclined blade, and by this is reversely deflected again toward the offset series, this successively alternate and reversing deflection of the air continuing until its force is spent. Any number of turbine wheels may be employed and arranged in coaxial position along and fixed on the main shaft 3, which is amply supported in suitable bearings 4, provided in and by an appropriate frame 5.

Preferably, the framework 5 includes a circular base 5ª, provided with wheels 6, and these are mounted upon circular and concentric tracks 7, having a vertical axis preferably passing near the axis of the shaft 3, so that the frame and the gang of turbine wheels W may be rotated to constantly present effective, pressure receiving portions of the blades during their rotation to the wind, irrespective of the variation in direction of the wind.

Means are provided for concentrating and directing the air under wind pressure so that it will be effective upon only a suitable portion of each of the wheel blades during their rotation, since the wheels operate and are disposed edge to the wind. To accomplish this, there is disposed upon the frame a concentrating chamber, or series of chambers, formed below the top or roof 10, which is shown as approximately horizontal and extending from a point approximately at the top of the gang of wheels, forwardly. Vertically below the top of the roof 10 is an upwardly and rearwardly inclined bottom or floor 11, terminating at its rear, higher end at the horizontal plane, approximately, of the main shaft 3, so that only the top, front quarter of the turbine wheels are exposed to the wind pressure. The wind collecting chamber between the top 10 and the bottom 11 may be provided with parallel, vertical partitions 12, which extend from front to rear of the concentrating chambers and have their rear edges curved at 12ª concentric to the main shaft 3, and are arranged adjacent to the periphery of the wheels W.

From this it will be seen that, by the present invention, it is possible to absorb to a considerable amount the power from an extensive volume of wind, this power being taken by turbine wheels presenting their faces or edges to the wind and being guarded in portions so as to eliminate wind resistance at those portions of the wheels moving up into the wind.

The power absorbed may be taken from the main shaft 3 as by bevel gears 8, one of which is secured on an axially disposed shaft 9 about which the frame 5 may swing on a horizontal orbit, this shaft delivering power through transmission gears 13 to a distributing shaft or shafts 14.

The air collecting apparatus may be maintained in facing position to the wind by any suitable means, and may be shifted to said position as, for instance, by a small motor 15, which may be utilized to drive one of the traction wheels 6 of the base of the frame.

In Figure 4, means are shown for utilizing that portion of the air which may be sweep across the diametrical portions of the turbine wheels in such manner as to reduce the friction of the air on the halves of the wheels that are moving up toward the front, deflecting apron. Since that portion of the air which sweeps across the central portion of the wheels can exert but little pressure upon the wheels, I provide a back scoop-like shield 16, arranged on the far side of the series of wheels so that the air sweeping diametrically from the front to the rear of the wheels without appreciable effect on the wheels will be deflected downwardly and thence forwardly under the shaft, where the forward tendency of the current of air will, if not having a driving effect on the wheels, serve in a measure to reduce the air resistance encountered by the rotating wheels sweeping through inert air.

The forward undercurrent as to the wheels may be increased by perforating the bottom 11 as at 17 adjacent its upper portion so that the current of air sweeping up over the bottom 11 will have a siphonic effect at and through the apertures 17, and air will therefore be drawn in through these apertures from below the bottom 11 and this siphonic action will, as just suggested, combine with the forward undercurrent of air to increase the velocity of the undercurrent so that the air will move practically in the same direction as the under-portions of the wheels. If desired, a conduit forming a false or inner bottom 18 may be fixed above the bottom 11 at a suitable distance above the apertures 17, and this will confine a portion of the air moving into the chamber between the bottom 11 and the inner bottom 18 to further insure the production of an induced current upwardly from below the bottom 11 and forwardly over the scoop bottom 16$^a$.

Further embodiments, modifications and variations may be resorted to within the principle of the invention.

What is claimed is:

1. In a wind power, a gang of turbine wheels disposed coaxially and with edges to the wind, means for deflecting the wind to portions of the wheels moving in a direction with the wind, means for gathering a portion of the air sweeping diametrically across the blades and deflecting the gathered air so as to cause it to move in the direction of that portion of each of the wheels which is moving toward the wind, and means for producing a suction effect to increase the forward movement of the air toward the front of the wheels.

2. A wind power comprising a circular track, a base mounted thereon, having wheels engaging said circular track, a framework mounted on said base, a vertical shaft carried by said framework and concentric with said circular track, a horizontal shaft mounted in bearings carried by said framework, a gear on said horizontal shaft and a bevel gear on said vertical shaft meshing with the gear on said horizontal shaft, a plurality of wind wheels mounted on said horizontal shaft, a roof extending across the top of said framework, an inclined floor on one side and extending across said framework and a plurality of vertical partitions between said roof and inclined floor.

3. A wind power comprising a circular track, a base mounted thereon having wheels engaging said circular track, a framework mounted on said base, a vertical shaft carried by said framework and concentric with said circular track, a horizontal shaft mounted in bearings carried by said framework, a gear on said horizontal shaft and a bevel gear on said vertical shaft meshing with the gear on said horizontal shaft, a plurality of wind wheels mounted on said vertical shaft, each of said wind wheels having two sets of radially disposed blades, a roof extending across the top of same framework, an inclined floor on one side and extending across said framework and a plurality of vertical partitions between said roof and inclined floor.

4. A wind power comprising a circular track, a base mounted thereon having wheels engaging said circular track, a framework mounted on said base, a vertical shaft carried by said framework and concentric with said circular track, a horizontal shaft mounted in bearings carried by said framework, a gear on said horizontal shaft and a bevel gear on said vertical shaft meshing with the gear on said horizontal shaft, a plurality of wind wheels mounted on said horizontal shaft, a roof extending across the top of same framework, an inclined floor on one side having a plurality of apertures formed therein, and extending across said framework, a plurality of vertical partitions between said roof and inclined floor and a scoop-like shell mounted on said framework on the side opposite to said inclined floor and having a portion extending under said wind wheels and connected to the underside of said inclined floor and blades between said vertical partitions and parallel with said inclined floor.

In testimony whereof I have signed my name to this specification.

C. H. SPENCER.